Figure 1:
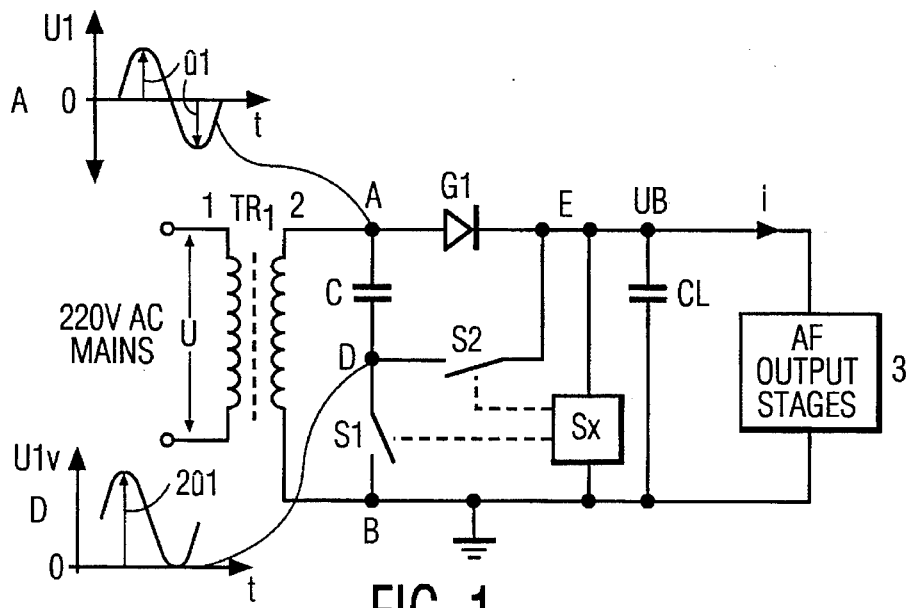

United States Patent [19]

Palata et al.

[11] Patent Number: 5,485,364

[45] Date of Patent: Jan. 16, 1996

[54] POWER SUPPLY FOR AN AF SOUND OUTPUT STAGE

[75] Inventors: Jaromir Palata; Jean-Paul Louvel, both of Villingen-Schwenningen, Germany

[73] Assignee: Deutsche Thomson-Brandt GmbH, Villingen-Schwenningen, Germany

[21] Appl. No.: 443,029

[22] Filed: May 17, 1995

Related U.S. Application Data

[63] Continuation of Ser. No. 128,621, Sep. 23, 1993, abandoned.

[30] Foreign Application Priority Data

Sep. 30, 1992 [DE] Germany ........................... 42 32 867.5

[51] Int. Cl.$^6$ ..................................................... H02M 7/19
[52] U.S. Cl. ................................. 363/59; 363/61; 330/297
[58] Field of Search .................... 363/59, 60, 61, 363/34; 323/352; 330/297, 310, 127

[56] References Cited

U.S. PATENT DOCUMENTS

| | | | |
|---|---|---|---|
| 3,828,239 | 8/1974 | Nagai et al. | 363/20 |
| 4,387,333 | 6/1983 | St. Ledger | 320/21 |
| 4,398,120 | 8/1983 | Guillon | 315/1 |
| 4,797,633 | 1/1989 | Humphrey | 330/297 |
| 5,142,171 | 8/1992 | Nunogawa et al. | 307/565 |

FOREIGN PATENT DOCUMENTS 1066002  11/1982  U.S.S.R. ......................... H02M 7/10

OTHER PUBLICATIONS

Patent Abstract of Japan, E–907 Mar. 23, 1990 vol. 14 No. 154 App. No. 63–161568.
Data sheets for 20W Hi–Fi Audio Power Amplifier TDA 2040 pp. 373–379, SGS Jun. 1982.
High Fidelity Technique, John A. Newitt, Rinehart & Co. Inc. pp. 12–20, 250 and 251 May 1959.

*Primary Examiner*—Peter S. Wong
*Assistant Examiner*—Adolf Berhane
*Attorney, Agent, or Firm*—Joseph S. Tripoli; Joseph J. Laks; Francis A. Davenport

[57] ABSTRACT

A power supply for an AF sound stage includes a transformer and a charging capacitor for storing an operating voltage. A rectifier connects the secondary winding of the transformer to the charging capacitor. A voltage doubler circuit, which includes a series connection of a second capacitor and a first switching means, is in parallel with the secondary winding. A second switching means connects the junction of the second capacitor and the first switching means to the charging capacitor.

8 Claims, 3 Drawing Sheets a continuation of application Ser. No. 08/128,621, filed Sep. 23, 1993 now abandoned.

POWER SUPPLY FOR AN AF SOUND OUTPUT STAGE

This is a continuation of application Ser. No. 08/128,621, filed Sep. 23, 1993 now abandoned.

The invention is based directed to a power supply for an AF sound output stage. It is desirable for the AF sound output stage in a television receiver to have a dynamic operating voltage which increases as the load current through the sound output stage falls. A voltage of this nature ensures that, a peak music power level of 20 watts for example, and at a low load current and a permanent sine wave power rating of 5 watts for a large load current, can be realized.

In the prior art, the generation of an operating voltage which increases at low load current requires a special transformer to control a rectifier circuit for the AF sound output stage. However, the winding of a transformer of this sort is complicated and expensive because the constructional parameters for achieving the desired voltage dependence can only be determined empirically. It is then necessary to initially wind a plurality of transformers in order to obtain one transformer having the desired properties.

It is an object of the invention to develop a simple circuit having a low dissipation for generating an operating voltage having the described dependence on the load current and which does not need any constructional alterations to the transformer controlling the circuit.

With the invention a voltage doubler circuit, which delivers approximately double the direct voltage of a conventional half-wave rectifier is connected in parallel with a conventional half-wave rectifier. As a result, at a relatively high load current, the half-wave rectifier determines the voltage on the load wherein this voltage is stabilized by a regulating circuit on the primary side of the transformer. However, as the load current falls, the voltage doubler circuit becomes more and more effective.

Since the voltage doubler circuit delivers approximately double the voltage of the half-wave rectifier, the voltage on the load is consequently increased due to the increasing influence of the voltage doubler circuit. The half-wave rectifier on the one hand and the voltage doubler circuit on the other thus automatically take over from one another in an advantageous manner as regards their effectiveness for the operating voltage present on the load without the switching over between the two rectifier circuits being required. The current at which the rectifiers take over from one another is dependent on the size of the coupling capacitor C which is located at the input of the doubler.

The voltage doubler circuit can be controlled in such a way that twice the voltage is available for a low current through the load and the single voltage is maintained constant for a high current. A controllable waveform of this type makes it possible to maintain a constant sine wave power while enabling a high music power rating. The circuit in accordance with the invention has many advantages. The transformer no longer has to be specially wound. Therefore, a special transformer is not needed and any available standard transformer can control the rectifier circuit for the AF sound output stage. The circuit in accordance with the invention has very few components and is substantially cheaper and easier to realize than the winding and manufacture of a special transformer. The transformer can then be optimally dimensioned in accordance with other considerations independently of the sound output stage. This is particularly advantageous if other operating voltages, which are not dependant on the load current, but which must be kept as constant as possible in dependence on the load current, are to be derived from the transformer. The invention is useful for both a pure main transformer at 50 Hz or 60 Hz as well as for the transformer of a switching power supply working at frequencies of 15–30 kHz.

Figure 2:
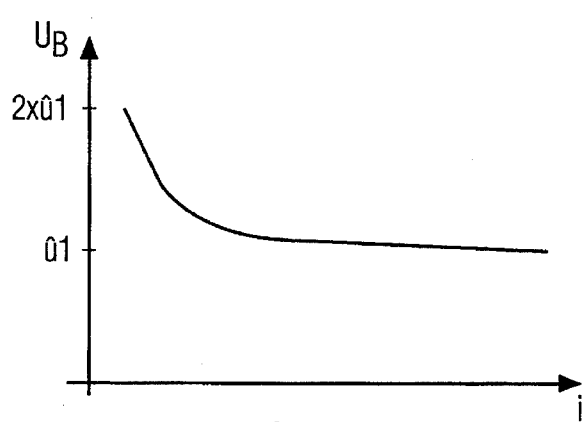
Figure 3:
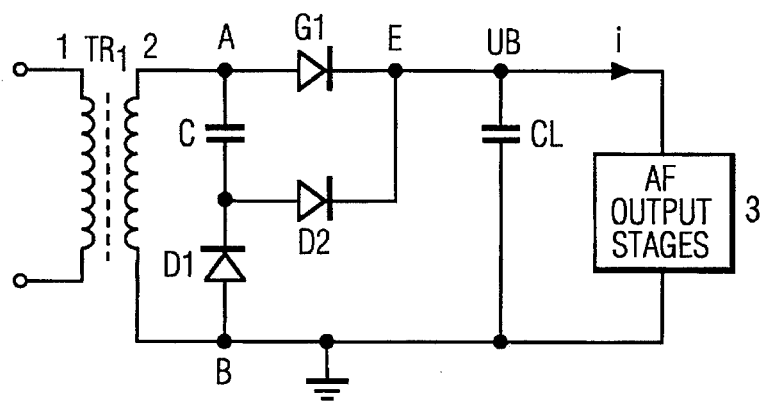
Figure 4:
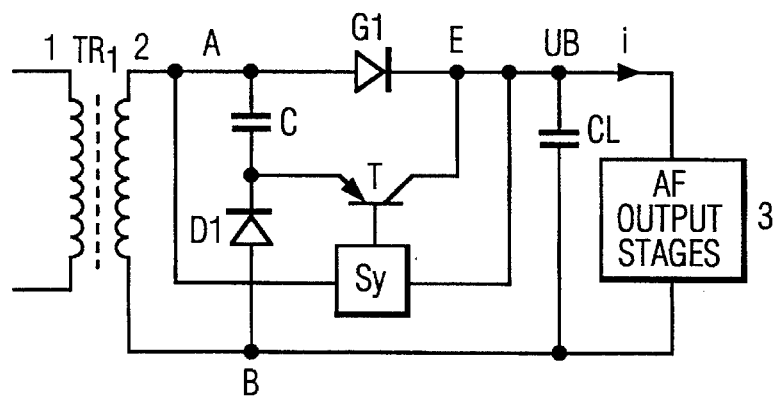
Figure 5:
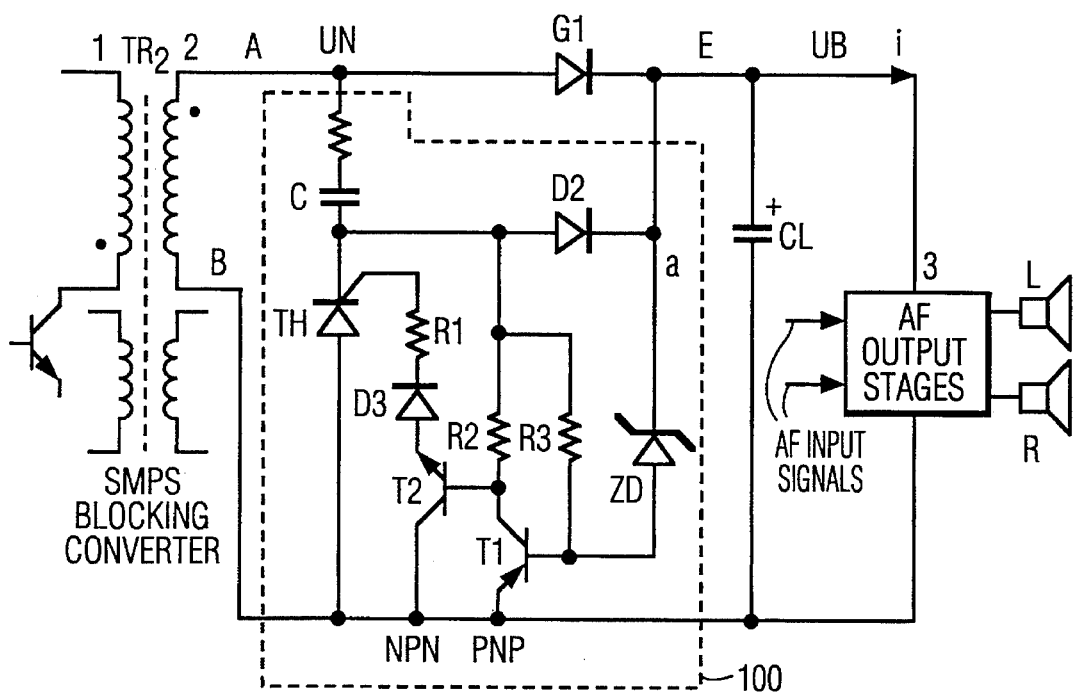
Figure 6:
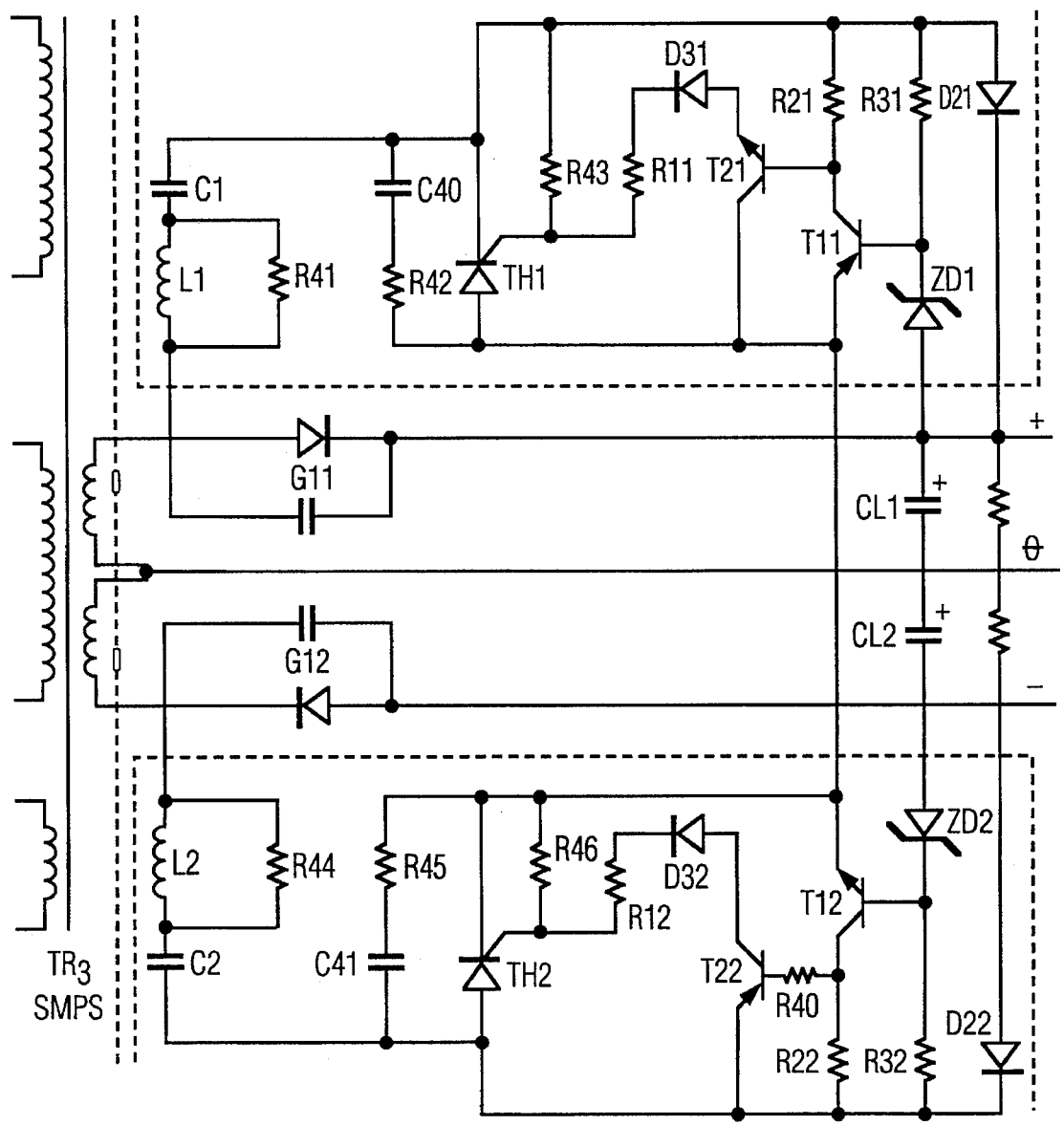

The invention is described with reference to drawings in which:

FIG. 1 shows a preferred embodiment of a power supply having controllable switches for voltage doubling, FIG. 2 shows the wanted waveform of the voltage having dependence on the lead current, FIG. 3 shows a preferred embodiment of a power supply having a voltage doubler circuit in parallel with the rectifier, FIG. 4 shows a preferred embodiment of a power supply having a voltage doubler circuit that can be turned-off by a transistor in parallel with the rectifier, FIG. 5 shows a preferred embodiment of a power supply having a voltage doubler circuit that is controlled by a thyristor in parallel with the rectifier for positive voltage supplies, FIG. 6 show a preferred embodiment useful with symmetrical voltage supplies.

In FIG. 1, a transformer has a primary winding 1 and a secondary winding 2 which supply an AF output stage 3, comprising audio power amplifier with a current i and a voltage UB via a rectifier G1 and a voltage doubler circuit which is in parallel with rectifier G1. The audio power amplifiers, for example TDA 2040, are responsive to dynamically varying audio frequency (AF) signals derived from sources not shown. The voltage doubler circuit is composed of switches S1 and S2 and capacitors C and CL.

In operation, when the point A is more negative than the point B, the capacitor C is charged to the voltage û1 via the switch S1. At the maximum point of the positive half wave, the switch S1 is opened and the voltage 2×û1 occurs on the switch S1. This voltage is transferred via the then closed switch S2 to the capacitor CL. The voltage û1 is present on capacitor C and the voltage 2×û1 is present on capacitor CL. The output voltage UB would have been generated by only one half of the oscillation if the voltage doubler circuit had not been connected in parallel with the rectifier G1. The rectifier G1 ensures that at least the voltage û1 is always available. The appropriate control of the switches S1 and S2 by the circuit Sx, ensures that the dependence of the voltage UB on the current i can be upwardly limited. The voltages at the points A and B are illustrated in the right hand part of FIG. 1. If the point B is assumed to be at earth, the direct voltage free alternating voltage û1 having the positive and negative peak values û1 is present at the point A. Because switch S1 is closed during the negative peak of û1, the voltage at the point D cannot become negative relative to earth. The first half wave charges the capacitor, C and the second half wave is in series with the charged capacitor C. Both half waves are thus added as regards voltage. The voltage UB cannot fall below the voltage of the half wave rectifier G1. The increase of the voltage UB with falling load or with increasing main voltage U main is upwardly limited by the regulation.

FIG. 2 shows the desired waveform of voltage UB wherein the voltage UB increases with falling current i. It can be seen that for a low current i, the voltage UB increases to double the value and for a large current i, the voltage UB is maintained constant at the single value. The music rating UBmax * imax is thus very high and sine power UBmax * imax is considerably smaller. The load dependency of the voltage UB is adjustable by the size of the capacitor C.

The FIG. 3 embodiment is similar to that of FIG. 1. However, the switches S1 and S2 are replaced by diodes D1 and D2. The circuit shown in FIG. 3 works in the following manner: For a large load current i, the supply of energy to the charging capacitor CL is effected mainly via the rectifier G1. Voltage UB corresponds approximately to the peak value of the voltage at the point A. The voltage doubler circuit C, D1 and D2 is substantially ineffective and only delivers a small portion, about 10–15%, of the energy delivered to the capacitor CL. For a small load current i on the other hand, the voltage doubler circuit is effective so that the voltage UB at the point E can rise, shown in FIG. 2. The rectifier G1 is thereby blocked in the desired manner because the voltage UB is larger than the maximum value of the voltage at point A. The voltage doubler circuit now determines the voltage UB which rises as shown in FIG. 2. The desired behavior of the circuit at a particular time can be affected by the dimensioning of the capacitor C which, in essence, determines the energy delivered to capacitor CL via the voltage doubler circuit.

FIG. 4 is similar to FIG. 3. However, diode D2 has been replaced by a transistor T which can be controlled in responsive to the current i by a control circuit Sy.

FIG. 5 shows a complete circuit having a regulated voltage doubler circuit 100. The diode D1 of FIGS. 3 and 4 is replaced by the thyristor Th which is controlled in response to the voltage UB by the illustrated circuit having transistors T1, T2, resistors R1, R2 and R3, a diode D3 and a Zener diode ZD. The diodes D2 and D3 ensure hat a flow of current is only possible in the desired direction. The regulation of the voltage doubler circuit occurs in the following manner. When the voltage UB is below a selected voltage value determined by Zener diode ZD, for example +39 volts, transistors T1 and T2 are conductive. Conduction in transistor T2 provides a path for gate current which allows thyristor Th to conduct at the beginning of each negative half cycle. Thus the voltage doubler comprising capacitor C, thyristor Th and diode D2, is enabled which generating additional volts across capacitor CL. When the voltage UB at point E exceeds the value determined by the Zener diode ZD, the transistors T1 and T2 are turned off, removing the gate current path from thyristor Th and ceasing operation of the voltage doubler. Thus no further energy is stored in capacitor C with the result that voltage UB falls until Zener diode ZD ceases conduction allowing the provision of gate current to thyristor Th and recommence voltage doubler action. Hence, as load current i, in audio amplifiers 3 decreases, voltage UB increases until the regulation value is reached, beyond which voltage UB is maintained at a regulated maximum value independent of further reductions in load current.

It remains to be explained that the control by the transistors T1, T2 does not cause any significant losses since the transistors T1 and T2 are without current and have a voltage before the firing of the thyristor, and T1 and T2 are free of voltage after the firing of the thyristor because the transistors T1 and T2 are located in parallel with the thyristor Th.

An inductance L in series with the capacitor C is significant. Without this inductance L, a relatively high current would pass through the capacitor C because initially capacitor C appears practically as a short circuit. A current peak of this nature is prevented by the inductance L. This has the advantage that a cheaper thyristor Th having a lower current rating can be used.

FIG. 6 shows a further development of the invention which is similar to FIG. 5 but is laid out for a symmetrical voltage supply. The positive branch is formed from a rectifier G 11, an inductance L1, a capacitor C1, a thyristor Th.1, a resistor R11, a diode D31, a transistor T21, a transistor T11, a resistor R21, a resistor R31, a Zener diode ZD1 a diode D21 and a charging capacitor CL1.

The negative branch is formed from a rectifier G12, an inductance L2, a capacitor C2, a thyrister Th.2, a resistor R12, a diode D32, a transistor T22, a resistor R40, a transistor T12, a resistor R22, a resistor R32, a Zener diode ZD2, a diode D22 and a charging capacitor CL2

In a tested circuit, the components essential for the invention had the following values:

R1: 100 ohms
R2: 4.7 kOhm
R3: 4.7 kOhm
C: 0.22 µF
CL: 1000 µF
L: 50 µH
G1: BYW 72 or BY 296
D2: BA 157
D3: IN4148
T1: BC558B
T2: BC548C
Th: ESM750
ZD: ZPD39V
AF: output stages: 2×TDA2040, audio power amplifiers
C1/C2=220 nF/100 V
L1/L2=50 µH
R41–R46=1 kOhm
C40/C41=10 nf
Th.1/Th.2=ESM 30/G1
R11/R12=100 ohms
D31/D32=BA 157
T21/T12=BC 546
T11/T22=BC 556
ZD1/ZD2=ZPY 20
R21/R22/R31/R32=4.7 kOhm
D21/D22=BY 297

We claim:

1. A power supply for an audio power amplifier having an input audio signal subject to dynamic amplitude variation said power supply comprising:

a transformer, having a secondary winding;

a rectifier coupled to said secondary winding;

a capacitor coupled to said rectifier and to said amplifier;

a first supply voltage value developed across said capacitor being coupled to said audio power amplifier; and, a voltage doubler coupled to said secondary winding having a greater supply voltage value than said first supply voltage value, and being controllably coupled to said amplifier responsive to said dynamic audio signal.

2. The power supply of claim 1, further comprising a voltage amplitude regulator for controllably determining a maximum voltage value of said second supply voltage.

3. The power supply of claim 2, wherein said voltage amplitude regulator is controlled responsive to a non-minimum current value supplied to said amplifier.

4. The power supply of claim 2, wherein said voltage amplitude regulator dissipates essentially zero power at said maximum voltage value.

5. The power supply of claim 1, wherein said audio signal having a sinusoidal wave shape causes said amplifier to dissipate a sustained first current value, said first current value causing said supply to generate said first supply voltage value.

6. The power supply of claim 1, wherein said audio signal having a arbitrary wave shape causes said amplifier to dissipate a second current value having a lesser value than said first current value, said second current value causing said second supply voltage to increase as said second current decreases.

7. The power supply of claim 1, wherein said voltage doubler includes an inductor for limiting impulsive charging current amplitude.

8. A power supply for an audio power amplifier comprising:

means for generating a supply voltage coupled to said audio power amplifier for powering thereof, said supply voltage having a voltage value inversely related to a power supply current coupled to said audio power amplifier; and, feedback means for controlling said supply voltage to a maximum voltage value, said means dissipating substantially zero power at said maximum voltage value.

\* \* \* \* \*